United States Patent
Iizuka et al.

(10) Patent No.: US 6,883,305 B1
(45) Date of Patent: Apr. 26, 2005

(54) METHOD FOR CLEANING EXHAUST GAS FROM AN INTERNAL COMBUSTION ENGINE

(75) Inventors: Hidehiro Iizuka, Hitachinaka (JP); Kojiro Okude, Hitachi (JP); Masato Kaneeda, Hitachi (JP); Kousei Nagayama, Tokai-mura (JP); Hisao Yamashita, Hitachi (JP); Osamu Kuroda, Hitachi (JP); Yuichi Kitahara, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/482,354

(22) Filed: Jan. 14, 2000

(30) Foreign Application Priority Data

Jan. 14, 1999 (JP) .......................................... 11-007313

(51) Int. Cl.$^7$ ............................. B01D 53/94; F01N 3/10
(52) U.S. Cl. ................... 60/274; 423/213.2; 423/213.5; 423/239.1
(58) Field of Search ........................... 423/213.2, 213.5, 423/239.1, 244.01, 244.06, 244.07, 244.09, 244.1, 245.3, 247; 60/274

(56) References Cited

U.S. PATENT DOCUMENTS

| | | | | |
|---|---|---|---|---|
| 5,849,255 A | * | 12/1998 | Sawyer et al. | ........... 423/213.5 |
| 5,948,376 A | * | 9/1999 | Miyoshi et al. | ........... 423/213.5 |
| 6,413,483 B1 | * | 7/2002 | Brisley et al. | ........... 423/239.1 |
| 6,455,463 B1 | * | 9/2002 | Labarge et al. | ............. 502/340 |
| 6,461,579 B1 | * | 10/2002 | Hachisuka et al. | ...... 423/213.5 |
| 6,471,923 B1 | * | 10/2002 | Becue et al. | ............. 423/213.2 |
| 2002/0141921 A1 | * | 10/2002 | Wu et al. | ................. 423/239.1 |
| 2002/0182134 A1 | * | 12/2002 | Wu et al. | ................. 423/239.1 |

FOREIGN PATENT DOCUMENTS

| | | |
|---|---|---|
| JP | 9-327617 A | 12/1997 |
| JP | 10-109032 A | 4/1998 |
| JP | 10-212933 A | 8/1998 |
| WO | WO 97/47864 | * 12/1997 |

* cited by examiner

Primary Examiner—Wayne A. Langel
(74) Attorney, Agent, or Firm—Crowell & Moring LLP

(57) ABSTRACT

In a method and apparatus for removing nitrogen oxides from the exhaust gas of a lean-burn automobile, a CO adsorbent component, which may, for example be made of Pd, Ru or Ir, is contained in an exhaust gas cleaning catalyst which captures NOx when the air-fuel ratio of exhaust gas is higher than theoretical air-fuel ratio, and reduces the captured NOx when the air-fuel ratio of exhaust gad is less than or equal to the theoretical air-fuel ratio. The catalyst, which includes Rh, Pt, and element selected from among the alkaline and alkaline earth metals (Na, Mg, K, Li, Cs, Sr and Ca), and a CO adsorbent material comprising Pd, Ir or Ru, has a CO desorption capacity that reaches at maximum level at a temperature within the range from 200 to 220° C. when its temperature is increased in a He gas flow at the rate of 5 to 10° C./min, after said catalyst is saturated at 100° C. Exhaust gas having an air-fuel ratio higher than theoretical air-fuel and exhaust gas having an air-fuel ratio less than or equal to the theoretical air-fuel ratio are alternately made to flow to the catalyst.

15 Claims, 2 Drawing Sheets

METHOD FOR CLEANING EXHAUST GAS FROM AN INTERNAL COMBUSTION ENGINE

BACKGROUND OF THE INVENTION

The present invention relates to the method, device and catalyst to clean exhaust gas discharged from an internal combustion engine including a car, and particularly to the method, device and catalyst to clean exhaust gas discharged from an internal combustion engine permitting lean burning of fuels and from a car equipped with said engine.

According to a heretofore known method, an exhaust gas cleaning catalyst is placed in the exhaust gas flow path of the internal combustion engine, and exhaust gas having an air-fuel ratio higher than theoretical air-fuel ratio (hereinafter referred to as "oxidation atmosphere") and exhaust gas having an air-fuel ratio equal to or smaller than theoretical air-fuel ratio (hereinafter referred to as "reduction atmosphere") are alternately made to contact said catalyst, thereby removing nitrogen oxides in exhaust gas. This method is disclosed, for example, in the Official Gazette of Japanese Patent Laid-Open NO. 212933/1998.

According to the Official Gazette of Japanese Patent Laid-Open NO. 327617/1997, a catalyst used in this type of exhaust gas cleaning method includes an alkaline earth metal and titanium. A catalyst containing titanium in the form of amorphous material is disclosed in said Gazette. The Official Gazette of Japanese Patent Laid-Open NO. 109032/1998 discloses a catalyst containing alkaline earth metal and titanium, wherein part of these materials take the form of composite oxides. The Official Gazettes of Japanese Patent Laid-Open NO. 327617/1997 and NO. 109032/1998 disclose that SOx contained in exhaust gas becomes difficult for alkaline earth metal to capture, and this makes it possible to suppress poisoning by SOx.

Inventions described in the Official Gazettes of Japanese Patent Laid-Open NO. 327617/1997 and NO. 109032/1998 are mainly intended to prevent alkaline earth metal as an NOx capturing agent from being poisoned by SOx. However, alkaline earth metal is not always immune to poisoning by SOx; it is subjected to poisoning by SOx if a long-term operation is performed in the oxidation atmosphere, and NOx removing performances are deteriorated.

SUMMARY OF THE INVENTION

The object of the present invention to provide an exhaust gas cleaning method ensuring excellent NOx removing performances, an exhaust gas cleaning catalyst, and an exhaust gas cleaning device, characterized by a high resistance to SOx poisoning.

The present invention ensures that the SOx deposited on catalyst in the oxidation atmosphere can be effectively removed by creating a reduction atmosphere.

The present invention relates to the exhaust gas cleaning method, exhaust gas cleaning catalyst and exhaust gas cleaning device featuring the following forms of embodiment:

1. An exhaust gas cleaning method for internal combustion engine wherein
   (1) an exhaust gas cleaning catalyst is placed in the exhaust gas flow path of an internal combustion engine, and
   (2) exhaust gas having an air-fuel ratio higher than theoretical air-fuel ratio and exhaust gas having an air-fuel ratio equal to or smaller than theoretical air-fuel ratio are alternately made to contact said catalyst, thereby removing nitrogen oxides in exhaust gas;

said exhaust gas cleaning method for internal combustion engine characterized in that said catalyst contains at least one element selected from alkaline metal and alkaline earth metal, Rh, Pt, and a CO absorbent component where the absolute value ($\Delta H$) of Co adsorbent enthalpy on the metal single crystal (111) surface is 142 KJ/mol or more;

said exhaust gas cleaning method further characterized in that the CO desorption temperature reaches the maximum level within the temperature range from 200 to 220° C. in the event of temperature rise in He gas flow at the rate of 5 to 10° C./min. after adsorption of CO to said catalyst by saturation at 100° C.

2. An exhaust gas cleaning method for internal combustion engine in said catalyst characterized in that said CO adsorbent compound comprises at least one type selected from Pd, Ir and Ru (claim 2).

3. An exhaust gas cleaning method for internal combustion engine characterized in that said catalyst contains at least one element selected from Ti, Si and Zr, and includes a composite oxide comprising said type(s) and at least one element selected from Na, Mg, K, Li, Cs, Sr and Ca.

4. An exhaust gas cleaning method for internal combustion engine wherein said catalyst further contains Ce.

5. An exhaust gas cleaning method for internal combustion engine wherein said exhaust gas cleaning method for internal combustion engine being characterized in that said catalyst contains at least one element of alkaline metal or alkaline earth metal selected from Na, Mg, K, Li, Cs, Sr and Ca on the surface of a porous carrier, Rh, Pt, at least one element selected from Zr and Ti and Si, and at least one element selected from Pd, Ir and Ru;

wherein the ratios of components relative to 100 parts by weight of said porous carrier are 5 to 30 pts. wt. for alkaline metal or alkaline earth metal in total, 8 to 35 100 pts. wt. for Ti, 3 to 25 pts. wt. for Si, 3 to 25 pts. wt. for Zr, 0.05 to 0.5 pts. wt. for Rh, 1.5 to 5 pts. wt. for Pt, and 0.25 to 3 pts. wt. for Pd, Ir and Ru in total.

6. An exhaust gas cleaning method for internal combustion engine wherein said catalyst further contains alkaline earth metal on said porous carrier, and the ratio of said alkaline earth metal relative to 100 parts by weight of said porous carrier is 5 to 50 pts. wt.

7. An exhaust gas cleaning catalyst for internal combustion engine which comprises at least one element selected from alkaline metal or alkaline earth metal, Rh, Pt and the CO adsorbent component where the absolute value ($\Delta H$) of Co adsorbent enthalpy on the metal single crystal (111) surface is 142 KU/mol or more, and where the CO desorption temperature reaches the maximum level within the temperature range from 200 to 220° C. in the event of temperature rise in He gas flow at the rate of 5 to 10° C./min. after adsorption of CO to said catalyst by saturation at 100° C.

8. An exhaust gas cleaning catalyst for internal combustion engine wherein said CO adsorbent compound comprises at least one element selected from Na, Mg, K, Li, Cs, Sr and Ca, and contains a composite oxide comprising said element (s) and at least one element selected from Zr and Ti and Si.

9. An exhaust gas cleaning catalyst for internal combustion engine wherein said alkaline metal or alkaline earth metal comprises at least one type selected from Na, Mg, K, Li, Cs, Sr and Ca, and contains a composite oxide comprising said element(s) and at least one type selected from Zr and Ti and Si.

10. An exhaust gas cleaning catalyst for internal combustion engine which further contains Ce.

11. An exhaust gas cleaning catalyst for internal combustion engine which has on the surface of a porous carrier at least one element selected from alkaline metal and alkaline earth metal, Rh, Pt, at least one element selected from Ti, Si and Zr, and at least one element selected from Pd, Ir and Ru; wherein said alkaline metal or alkaline earth metal comprises at least one element selected from Na, Mg, K, Li, Cs, Sr and Ca;

the ratios of components relative to 100 parts by weight of said porous carrier are 5 to 30 pts. wt. for alkaline metal or alkaline earth metal in total, 8 to 35 pts. wt. for Ti, 3 to 25 pts. wt. for Si, 3 to 25 pts. wt. for Zr, 0.05 to 0.5 pts. wt. for Rh, 1.5 to 5 pts wt. for Pt, and 0.25 to 3 pts. wt. for at least one element selected from Pd, Ir and Ru in total.

12. An exhaust gas cleaning catalyst for internal combustion engine on the surface of said porous carrier, characterized in that said catalyst further contains rare earth metal, and the ratio of said rare earth metal relative to 100 parts by weight of said porous carrier is 5 to 50 pts. wt.

13. An exhaust gas cleaning device for internal combustion engine characterized in that an exhaust gas cleaning catalyst is arranged in the exhaust gas flow path of said internal combustion engine where there is a flow of exhaust gas having an air-fuel ratio higher than theoretical air-fuel ratio and exhaust gas having an air-fuel ratio equal to or smaller than theoretical air-fuel ratio;

said exhaust gas cleaning device further characterized in that said exhaust gas cleaning catalyst contains at least one element selected from alkaline metal and alkaline earth metal, Rh, Pt, and CO adsorbent component wherein the absolute value ($\Delta H$) of CO adsorbent enthalpy on the metal single crystal (111) surface is 142 KJ/mol or more, and where the CO description temperature reaches the maximum level within the temperature range from 200 to 220° C. in the event of temperature rise in He gas flow at the rate of 5 to 10° C./ml after adsorption of Co to said catalyst by saturation at 100° C.

14. An exhaust gas cleaning device for internal combustion engine wherein said CO adsorbent component comprises at least one element selected from Pd, Ir and Ru.

15. An exhaust gas cleaning device for internal combustion engine wherein said alkaline metal or alkaline earth metal comprises at least one element selected from Na, Mg, K, Li, Cs, Sr and Ca, and contains a composite oxide comprising said element(s) and at least one element selected from Zr and Ti and Si.

16. An exhaust gas cleaning device for internal combustion engine wherein said catalyst further contains Ce.

17. An exhaust gas cleaning device for internal combustion engine characterized in that an exhaust gas cleaning catalyst is arranged in the exhaust gas flow path of said internal combustion engine where there is a flow of exhaust gas having an air-fuel ratio higher than theoretical air-fuel ratio and exhaust gas having an air-fuel ratio equal to or smaller than theoretical air-fuel ratio;

wherein said catalyst further contains on the surface of a porous carrier at least one element selected from alkaline metal and alkaline earth metal, Rh, Pt, at least one element selected from Ti, Si and Zr, and at least one element selected from Rh, Pt and Ru;

said exhaust gads cleaning device further characterized in that the ratios of components relative to 100 parts by weight of said porous carrier are 5 to 30 pts. wt. for alkaline metal or alkaline earth metal in total, 8 to 35 pts. wt. for Ti, 3 to 25 pts. wt. for Si, 3 to 25 pts. wt. for Zr, 0.05 to 0.5 pts. wt. for Rh, 1.5 to 5 pts. wt. for Pt, and 0.25 to 3 pts. wt. for at least one element selected from Pd, Ir and Ru in total;

wherein the CO desorption temperature reaches the maximum level within the temperature range from 200 to 220° C. in the event of temperature rise in He gas flow at the rate of 5 to 10° C./min. after adsorption of CO to said catalyst by saturation at 100° C.

18. An exhaust gas cleaning device for internal combustion engine on the surface of said porous carrier, characterized in that said exhaust gas cleaning catalyst further containing rare earth metal, and the ratio of said rare earth metal relative to 100 parts by weight of said porous carrier is 5 to 50 pts. wt.

According to the present invention, alkaline metal or alkaline earth metal causes NOx to be captured on the catalyst surface in the oxidation atmosphere. Then, a composite oxide comprising said alkaline metal, alkaline earth metal, and at least one element selected from Ti, Zr and Si makes it possible to capture NOx in the oxidation atmosphere firmly on the catalyst surface. Pt and Rh serve as an NOx reducing agent. They remove by reduction the NOx remaining captured onto the NOx capturing compound surface in the oxidation atmosphere by means of the reducing agent such ad HC, CO and $H_2$ coexisting in exhaust gas in the reduction atmosphere. The CO adsorbent compound acts to remove by reduction the SOx captured by the capturing compound, using the reducing agent such as CO, HC and $H_2$ contained in the exhaust gas of reduction atmosphere.

SOx poisoning in exhaust gas cleaning catalyst according to the present invention is caused approximately by equations (1) to (3). Firstly, as shown in equation (1), $SO_3$ is generated by oxidation of $SO_2$. The generated $SO_3$ reacts with the compound capturing the NOx (M:NOX capturing agent) to generate sulfite compound as shown in equation (2), or sulfate compound as given in equation (3). Sulfite compound and sulfate compound are strongly acid; therefore, when these are generated, it becomes difficult to capture the NOx which will become acid molecule, as illustrated in equation 4.

$$SO_2 + 1/2 O_2 \rightarrow SO_3 \tag{1}$$

$$M + SO_3 \rightarrow M\text{-}SO_3 \tag{2}$$

$$M\text{-}SO_3 + 1/2 O_2 \rightarrow M\text{-}SO_4 \tag{3}$$

$$M + NOx \rightarrow M\text{-}NOx \tag{4}$$

The inventions disclosed in the Official Gazettes of Japanese Patent Laid-Open NO. 327617/1997 and NO. 1090327/1998 show that the progress of equations (2) and (3) is suppressed by Ti carried by alkaline earth metal serving as an NOx capturing agent.

By contrast, the present inventors consider that deposition of SOx onto the NOx capturing agent cannot be avoided in the oxidation atmosphere, and aimed at achieving an effective removal of the captured SOx in the atmosphere of reduction.

Reaction of removing the SOx captured on the catalyst surface is considered to progress approximately according to the equations (5) to (8). The HC, CO and $H_2$ coexisting in exhaust gas in the reduction atmosphere are captured on the HC, CO and H$_2$ adsorbent (represented in terms of PM). The HC, CO and H$_2$ (represented in terms of PM-HC, CO and H$_2$) adsorbed on PM react with sulfite compound as shown in expression (6), and the captured SOx is removed from the NOx capturing agent. SOx is also removed by the reaction of reducing sulfate compound to sulfite compound as expressed in equation (7) and by the reaction of reducing sulfate compound as given in equation (8).

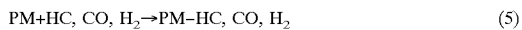

PM+HC, CO, H$_2$→PM-HC, CO, H$_2$     (5)

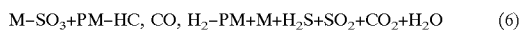

M-SO$_3$+PM-HC, CO, H$_2$-PM+M+H$_2$S+SO$_2$+CO$_2$+H$_2$O   (6)

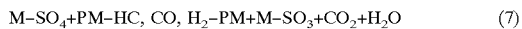

M-SO$_4$+PM-HC, CO, H$_2$-PM+M-SO$_3$+CO$_2$+H$_2$O   (7)

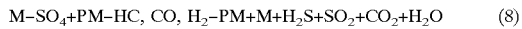

M-SO$_4$+PM-HC, CO, H$_2$-PM+M+H$_2$S+SO$_2$+CO$_2$+H$_2$O   (8)

To develop the reaction in the equation (5), it is necessary to have HC, CO and H$_2$ adsorbent to adsorb HC, CO and H$_2$. Study of the reaction of removing the captured SOx in the reduction atmosphere where NO and oxygen coexist has revealed that, of HC, CO and H$_2$, CO makes the greatest contribution to the removal of captured SOx.

The captured SOx can be most effectively eliminated by the CO adsorbent which selectively adsorbs CO out of HC, CO and H$_2$.

Reaction temperature is also involved in the reaction of removing the captured SOx. Higher the reaction temperature, the better for it. In automobiles, however, feed of exhaust gas in the reduction atmosphere of 600° C. or more leads to increase in fuel costs. From the view point of practical utility, therefore, reaction temperature is preferred to be about 500° C.

As can be seen from the above discussion, the present invention aims at achieving at effective removal of the captured SOx, using such reducing agents as HC, CO and H$_2$ in the reduction atmosphere of about 500° C.

The absolute value of CO adsorption enthalpy (ΔH) serves as an indication to judge the CO adsorption power of CO adsorbent. A material having a greater absolute value in CO adsorption enthalpy has a greater capacity to attract CO. The following shows the absolute values (ΔH) of CO adsorbent enthalpy on the metal single crystal (111) surface in the descending order (Source: Basic Course in Chemical Handbook by The Chemical Society of Japan):

Ru (ΔH: 160 KJ/mol)>Pd (142), Ir (142)>Pt (138)>Rh (132)>Co (128)>Ni (125)>Fe (105)>Cu (50)>Ag (27).

The above shows that Ru, Pd and Ir are preferred as CO adsorbent having a greater capacity to attract CO. Ru is subjected to evapotranspiration at high temperature, and Ir is of rare occurrence. When practical utility is taken into account, Pd and CO less subjected to evapotranspiration and characterized by stable occurrence are best preferred as CO adsorbent.

CO adsorption power varies according to the carried state, added volume and catalyst baking temperature in addition to the type of metal of the CO adsorbent. The degree of CO adsorption power of the CO adsorbent can be evaluated according to the thermal desorption method. Measurement procedures can be described as follows: Temperature is raised in He gas flow at the rate of 5 to 10° C./min. after adsorption of CO onto exhaust gas cleaning catalyst by saturation at 100° C. Then the volume of CO desorption with respect to temperature is measured at the catalyst outlet. For the catalyst with high CO adsorption power, the temperature where the volume of CO desorption is maximized shifts to the higher side.

For the exhaust gas cleaning catalyst capable of removing the captured SOx in the reduction atmosphere of about 500° C., the volume of CO desorption was maximized at the temperature ranging from 200 to 220° C. For the exhaust gas cleaning catalyst incapable of removing the captured SOx, the volume of CO desorption was maximized at about 175° C.

The above discussion suggests that Pd, Ru and Ir having the absolute values (ΔH) of CO adsorbent enthalpy of 140 kJ/mol or more on the metal single crystal (111) surface are preferred as CO adsorbent. From the view point of practical utility, Pd is the most preferable for said reasons. Furthermore, the catalyst including CO adsorbent is best preferred when the maximum value of the CO desorption temperature reaches 200 to 220° C. in thermal desorption.

The captured SOx in the reduction atmosphere can be more quickly removed when the volume of SOx captured by the NOx capturing agent is smaller. Furthermore, formation of SOx on the catalyst surface as sulfite compound is more likely to be reduced than formation of SOx as sulfate compound. The NOx capturing agent comprises at least one type selected from Na, Mg, K, Li, Cs, Sr and Ca, and includes a composite oxide comprising said type(s) and at least one type selected from Ti, Si and Zr. When NOx is made to be captured on the catalyst surface by chemical adsorption, a smaller volume of SOx is deposited on the NOx adsorbent. Even when SOx is deposited, generation of sulfite compound proceeds, thereby facilitating SO reduction.

Composite oxides between Sr and Ti include SrTiO$_3$, Sr$_2$TiO$_4$, Sr$_3$Ti$_2$O$_7$, Sr$_4$Ti$_3$O$_{10}$, SrTi$_{12}$O$_{19}$, SrTi$_{21}$O$_{38}$.

Composite oxides between Sr and Si include SrSiO$_3$, Sr$_3$SiO$_5$ and Sr$_2$SiO$_4$.

Composite oxides between Sr and Zr include SrZrO$_3$, Sr$_2$ZrO$_4$, Sr$_3$Zr$_2$O$_7$ and Sr$_4$Zr$_3$O$_{10}$.

Composite oxides between Sr and Ti and Zr include Sr$_2$(Ti$_{0.25}$ Zr$_{0.75}$).

Composite oxides between Sr, Ti and Si include SrTiSi$_2$O$_8$.

Furthermore, composite oxides formed with at least one type selected from Na, Ti, Si and Zr include the following, for example:

Composite oxides between Na and Ti include Na$_2$TiO$_3$, Na$_2$Ti$_3$O$_7$, Na$_2$T$_{14}$O$_9$, Na$_2$Ti$_6$O$_{13}$, Na$_4$Ti$_5$O$_{12}$, Na$_{0.23}$ TiO$_2$, Na$_2$TiO$_{19}$, Na$_4$Ti$_3$O$_8$, Na$_4$Ti$_3$O$_8$, Na$_4$TiO$_4$, Na$_8$Ti$_5$O$_{14}$, γ-Na$_2$TiO$_3$, β-Na$_2$TiO$_3$, NaTiO$_2$ and Na$_{0.46}$TiO$_2$. Of these, Na$_2$TiO$_3$ and Na$_2$Ti$_3$O$_7$ are preferred.

Composite oxides between Na and Si include Na$_4$SiO$_4$, β-Na$_2$Si$_2$O$_5$, Na$_2$Si$_2$O$_5$, Na$_2$Si$_4$O$_9$, γ-Na$_2$Si$_2$O$_5$, Na$_6$Si$_2$O$_7$, α-Na$_2$Si$_2$O$_5$, δ-Na$_2$Si$_2$O$_5$, Na$_2$Si$_3$O$_7$, α-Na$_2$Si$_2$O$_5$, Na$_6$Si$_8$O$_{19}$, Na$_2$Si$_3$O$_7$, α-Na$_2$Si$_2$O$_5$, Na$_2$SiO$_3$, Na$_4$SiO$_4$, Na$_2$SiO$_3$, Na$_4$SiO$_4$, α-Na$_2$Si$_2$O$_5$, Na$_2$Si$_2$O$_5$ and Na$_2$Si$_4$O$_9$. Composite oxides between Na and Zr include NaZrO$_3$, α-NaZrO$_3$ and Na$_2$ZrO$_3$. Composite oxides between Na, Zr and Si include Na$_2$ZrSiO$_5$, Na$_2$Zr$_2$Si$_{10}$O$_{31}$, Na$_{14}$Zr$_2$Si$_4$O$_{11}$, Na$_2$ZrSi$_4$O$_{11}$ and Na$_{14}$Zr$_2$Si$_{10}$O$_{31}$.

Composite oxides between Na, Ti and Si include Na$_2$TiSi$_2$O$_7$, NaTiSi$_2$O$_6$ and Na$_2$TiSiO$_5$.

The structure of the above composite oxides can be confirmed by powder X-ray diffractometry. To get said composite oxides, heat treatment at 600° C. or more is preferred. The preferred baking temperature is 700° C.

The catalyst according to the present invention has a three-way component catalyst function in the reduction atmosphere. To increase this function, it is preferred to add to the catalyst of this invention the component which has an oxygen storage function. The material having an oxygen storage function includes cerium (Ce).

To increase the heat resistance of exhaust gas cleaning catalyst, it is preferred to add such rare-earth metals as La and Y in addition to Ce.

The following shows the particularly preferred percentages of the catalyst of the present invention relative to 100 parts by weight of said porous carrier:

8 relative to 100 parts by weight of said porous carrier:

8 to 15 pts. wt. for alkaline metal or alkaline earth metal in total, 4 to 15 pts. wt. for Ti, 5 to 10 pts. wt. for Si, 5 to 10 pts. wt. for Zr, 0.10 to 0.20 pts. wt. for Rh, 1.0 to 3.0 pts. wt. for Pt, 0.25 to 0.8 pts. wt. for Pd, and 10 to 30 pts. wt. for rare-earth metal.

Catalyst of the present invention can be used in a great variety of forms. For example, it can be used in the form of honeycomb which is obtained by coating with powdered catalyst carrying various components the honeycomb structure comprising various materials such as cordierite and stainless. Furthermore, it can be used in the form of pellets, granules and powder. The form of honeycomb is preferred when it is placed in the exhaust gas flow path of a car.

Catalyst can be prepared by physical preparation methods including impregnation method, kneading method, coprecipitation method, sol-gel method, ion exchange method and vapor deposition method, as well as by methods based on chemical reaction.

If the CO adsorbent and NOx capturing agent are placed close to each other, the reaction of removing the captured SOx in equations (5) to (8) is likely to progress. In the case of catalyst preparation by impregnation method, therefore, it is preferred to use the mixed solution of CO adsorbent and NOx capturing agent and to provide simultaneous impregnation of CO adsorbent and NOx capturing agent on the carrier.

Nitrate compound, acetic acid compound, complex compound, hydroxide, carbonic acid compound, organic compound, dinotrodiamine complex and other various types of compounds, as well as metal and metal oxide can be used as starting materials for NOx removing catalyst.

When Pd is used as CO adsorbent, dinotrodiamine Pb solution is preferred. Use of dinotrodiamine Pb solution increases the proximity effect with NOx capturing agent. This leads to resultant removal of captured SOx from the NOx capturing agent by reduction.

In said methods, alumina, titanium, silica, silica-alumina, magnesia and such related metal oxides as well as composite oxides can be used as as a porous carrier. Since it is heat resistant, alumina is most preferred.

DESCRIPTION OF PREFERRED EMBODIMENTS

Figure 2:
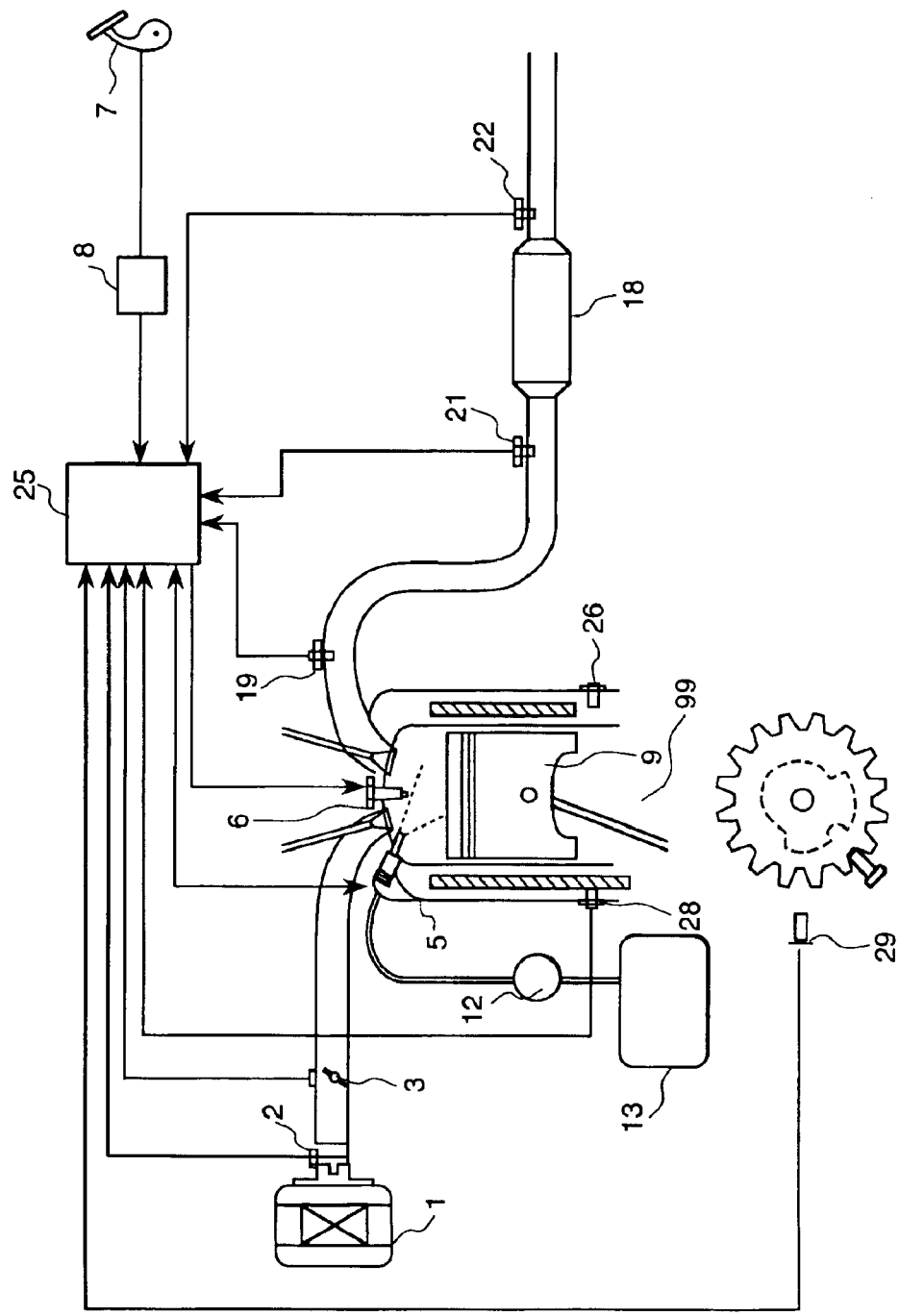
FIG. 2 is a schematic diagram representing the engine system installed on the exhaust gas cleaning device according to the present invention.

FIG. 2 shows an example of the engine system equipped with exhaust gads cleaning device. The engine 99 of the present embodiment is designed as a cylinder internal jet type. Said engine is supplied with air fed through air cleaner 1 and fuel jetted from the injector 5 fed from the fuel tank 13. Air flow path is provided with an air flow sensor 2 and throttle valve 3, and the fuel flow path is equipped with a fuel pump 12. An exhaust gas cleaning catalyst 18 corresponding to the exhaust gas cleaning device of the present invention is placed in the exhaust gas flow path. An air-fuel ratio sensor 19 and exhaust gas temperature sensor 21 are installed on the upstream side of the exhaust gas clean catalyst 18. A temperature sensor 22 to measure the catalyst outlet temperature is mounted on the downstream side. Various pieces of information required for engine operations are fed to the engine control unit 25. In the present embodiment, the signals from the air flow sensor 2, throttle valve 3, load sensor 8 to measure the ratio of depressing the acceleration pedal 7, air-fuel ratio sensor 19, temperature sensors 21 and 22, water temperature sensor 28 to measure the engine water temperature and crank angle sensor 29 are sent to the engine control unit 25. Numeral 9 in FIG. 2 denotes a piston, and 26 shows a knock sensor. The injector 5 and firing plug 6 are controlled by signals from the engine control unit 25.

The engine control unit 25 has an operation state determining means and an air-fuel ratio (A/F) controller. Said operation state determining means has a captured NOx volume estimating means, a discharged NOx volume estimating means, a captured SOx volume estimating means, and a discharged SOx volume estimating means. Captured NOx volume at the air-fuel ratio higher than theoretical ratio is estimated by the captured NOx volume estimating means, and captured SOx volume is estimated by captured SOx volume estimating means. When said captured NOx volume estimating means or captured SOx volume estimating means has determined that the predetermined level of captured NOx volume or captured SOx volume has been exceeded, then the discharged NOx volume estimating means and discharged SOx volume estimating means send a command to the A/F controller. In response to this command, the engine control unit 25 causes the cylinder internal injection engine 99 to be operated at the air-fuel ratio equal to or below the theoretical air-fuel ratio.

When the discharged NOx volume estimating means has determined that the predetermined level of captured NOx volume is removed, and the discharged SOx volume estimating means has determined that the predetermined level of captured SOx volume is removed, then a command is sent to the A/F controller. In response to this command, the engine control unit 25 causes the cylinder internal injection engine 99 to be operated at the air-fuel ratio above the theoretical air-fuel ratio.

Said predetermined volume is an arbitrarily set volume, e.g. 50% of the maximum captured NOx volume is set as a predetermined captured NOx volume.

Captured NOx and SOx volumes are estimated according to the information sent from air-fuel ratio sensor (or oxygen sensor) 19, temperature sensors 21 and air flow sensor 2.

An equation to calculate the adsorbed Nox volume is stored in the captured NOx estimating means in advance, based on the Nox volume in exhaust gas, exhaust gas temperature and lean operation time.

The NOx volume in exhaust gas is calculated from the air-fuel ratio of the exhaust gas obtained from air-fuel ratio sensor (or oxygen sensor) 19 and exhaust gas flow rate gained from air flow sensor 2.

Exhaust gas temperature is gained from the exhaust gas temperature sensor 21.

The lean operation time is obtained by time measurement of the air-fuel ratio of the exhaust gas obtained from air-fuel ratio sensor (or oxygen sensor) 19.

Similarly, an equation to calculate the captured SOx volume is stored in the captured SOx estimating means in advance, based on the SOx volume in exhaust gas, exhaust gas temperature and lean operation time.

It should be noted here that the S volume in the commercially available fuel has an allowable range. To be on the safe side, therefore, the maximum value within the allowable range is stored in the captured SOx estimating means as the S volume in the fuel in advance.

Consequently, SOx concentration in the exhaust gas can be calculated from the volume of fuel used in the cylinder internal injection engine 99 and exhaust gas flow rate. Fuel volume can be calculated from the air-fuel ratio obtained from the air-fuel ratio sensor (or oxygen sensor) 19. The exhaust gas flow rate is gained air flow sensor 2.

The discharged volumes of captured NOx and SOx can be estimated by storing an equation for calculation from the air-fuel ratio of exhaust gas, exhaust gas flow rate and exhaust gas temperature into the discharged NOx volume estimating means and discharged SOx volume estimating means in advance.

The following describes the preferred embodiments of the present invention; however, it should not be understood that the present invention is limited only to the following description.

(Embodiment 1)

Slurry consisting of precursors of powdered alumina and alumina and having been adjusted to have nitric acidity was coated on cordierite-made honeycomb (400 cells inc$^2$), and was dried and baked to get alumina coated honeycomb. In this case, said honeycomb was coated with 190 g of alumina per liter of apparent honeycomb capacity. After said alumina coated honeycomb was impregnated with aqueous solution of nitrate and cerium, it was dried at 200° C., then baked at 600° C.

Then it was impregnated with dinitro diamine Pt nitric acid solution, and mixture solution of Rh nitrate, dinitro diamine Pd, Sr nitrate, Mg nitrate and titania sol, and was dried at 200° C., then baked at 700° C.

Then the present inventors obtained catalyst 1 (Embodiment) containing 0.26 g of Pd, 11 g of Sr, 4 g or Ti, 0.9 g of Mg, 0.11 g of Rh, 1.4 g of Pt, and 14 g of Ce for 100 g of alumina in terms of metals. Pd was used as CO adsorbent in catalyst 1 (Embodiment). The present inventors got catalysts 2 to 5 (Embodiments) carrying Co, Ni, Ir and Ru instead of Pd, and catalyst 1 (Comparative Examples) without carrying Pd. It should be noted that the first and second components in Table indicate the order of carrying. The first component is carried earlier. The carried volume with respect to 100 g of alumina is described before the carrier components. For example, "14Ce" indicates that 14 g of Ce is carried with respect to 100 g of alumina in terms of metals.

TABLE 1

| Catalyst | 1st component | 2nd component |
| --- | --- | --- |
| Catalyst 1 (Embodiment) | 14Ce | 0.26Pd, 11Sr, 4Ti, 0.9Mg, 0.11Rh, 1.4Pt |
| Catalyst 2 (Embodiment) | 14Ce | 0.52Co, 11Sr, 4Ti, 0.9Mg, 0.11Rh, 1.4Pt |
| Catalyst 3 (Embodiment) | 14Ce | 0.52Ni, 11Sr, 4Ti, 0.9Mg, 0.11Rh, 1.4Pt |

TABLE 1-continued

| Catalyst | 1st component | 2nd component |
| --- | --- | --- |
| Catalyst 4 (Embodiment) | 14Ce | 0.26Ir, 11Sr, 4Ti, 0.9Mg, 0.11Rh, 1.4Pt |
| Catalyst 5 (Embodiment) | 14Ce | 0.26Ru, 11Sr, 4Ti, 0.9Mg, 0.11Rh, 1.4Pt |
| Catalyst 6 (Embodiment) | 14Ce | 0.26Ag, 11Sr, 4Ti, 0.9Mg, 0.11Rh, 1.4Pt |
| Catalyst 1 (Comparative Example) | 14Ce | 11Sr, 4Ti, 0.9Mg, 0.11Rh, 1.4Pt |

TEST EXAMPLE 1

To study resistance to SOx poisoning in catalysts 1 to 6 (Embodiments) and catalyst 1 (Comparative Example), the present inventors examined the NOx removing rate before and after SOx poisoning, and investigated recovery of catalyst performances by catalyst regeneration. Gases used for test was model gas for oxidation atmosphere simulating the lean-burn exhaust gas, model gas for reduction atmosphere simulating combustion at the theoretical air-fuel ratio and SOx poisoning model gas for SOx poisoning in oxidation atmosphere. It should be noted that SOx concentration in said SOx poisoning model gas was set to 150 ppm in order to accelerate catalyst SOx poisoning.

Model gas for oxidation atmosphere was composed of the following; 600 ppm of NOx, 500 ppm of $C_3H_6$, 0.1% of CO, 10% of $CO_2$, 5% of $O_2$, 10% of $H_2O$, and the remaining percentage of $N_2$.

Model gas for reduction atmosphere was composed of the following; 1000 ppm of NOx, 600 ppm of $C_3H_6$, 0.5% of CO, 5% of $CO_2$, 0.5% of $O_2$, 0.3% of $H_2$, 10% of $H_2O$, and the remaining percentage of $N_2$.

Accelerated SOx poisoning model gas was composed of the following; 150 ppm of $SO_2$, 600 ppm of NOx, 500 ppm of $C_3H_6$, 0.1% of CO, 10% of $CO_2$, 5% of $O_2$, 10% of $H_2O$, and the remaining percentage of $N_2$.

Test was according to the following procedures:

Firstly, model gas for reduction atmosphere and model gas for oxidation atmospheres were subjected to the test in that order where they were alternately fed to the catalyst layer at intervals of three minutes (hereinafter referred to as "repeated test") for a total of 18 minutes, and the NOx removing rate was measured. In this case, catalyst capacity was 6 cc, and SV was 30,000/h.

Then said accelerated SOx poisoned model gas was passed through the catalyst layer; then model gas for reduction atmosphere and model gas for oxidation atmospheres were alternately fed to the catalyst layer at intervals of three minutes for a total of 18 minutes, and the NOx removing rate was measured after being poisoned by SOx. In this case, poisoning temperature was 300° C. and poisoning time was one hour, with SV of 30,000/h.

Lastly, said model gas for reduction atmosphere was passed through the catalyst layer under the 30,000/h SV conditions at 500° C. for ten minutes (hereinafter referred to as "regeneration"); then model gas for reduction atmosphere and model gas for oxidation atmospheres were alternately fed through the catalyst layer at intervals of three minutes for a total of 18 minutes, and the NOx removing rate was measured.

Unless otherwise specified hereinafter, repeated tests were conducted at the temperature of 400° C. with SV of 30,000/h. Furthermore, NOx removing rate was assumed as the rate of reduction in NOx concentration before and after gas was passed through the catalyst layer after the lapse of ten minutes halfway through the repeated test, namely one minute after switching over to model gas for oxidation atmosphere. NOx removing rate was obtained from Equation 1.

$$NOx \text{ removing rate} = \frac{\begin{pmatrix} NOx \text{ concentration before passing} \\ \text{through the catalyst layer} \end{pmatrix} - \begin{pmatrix} NOx \text{ concentration after passing} \\ \text{through the catalyst layer} \end{pmatrix}}{\begin{pmatrix} NOx \text{ concentration before passing} \\ \text{through the catalyst layer} \end{pmatrix}} \times 100 \quad \text{(Equation 1)}$$

(Test Result)

Table 2 shows the results of measuring the NOx removing rates before and after SOx poisoning treatment and NOx removing rate after regeneration. Recover of the NOx removing rate by regeneration was observed in catalyst 1 (Embodiment) where Pd was carried, catalyst 4 (Embodiment) where Ir was carried and catalyst 5 (Embodiment) where Ru was carried. However, no recover of the NOx removing rate by regeneration was observed in catalyst 1 (comparative Example), catalyst 2 (Embodiment) and catalyst 3 (Embodiment). This clearly indicates that recovery of NOx removing performances by regeneration can be promoted when Pd, Ir and Ru are carried.

Table 3 shows the absolute values (ΔH) of CO adsorbent enthalpy on the metal single crystal (111) surface in the descending order (Source: Basic Course in Chemical Handbook by The Chemical Society of Japan, revised version, 1993) for each CO adsorbent and recovery or non-recovery of NOx removing rate by regeneration. For the metals (Ru, Ir and Pd) with ΔH of 140 kJ/mol or more, recovery of the NOx removing rate was observed.

TABLE 2

| Catalyst | Initial NOx removing rate (%) | NOx removing rate (%) after SOx poisoning | NOx removing rate (%) after regeneration |
|---|---|---|---|
| Catalyst 1 (Embodiment) | 80 | 47 | 49 |
| Catalyst 2 (Embodiment) | 70 | 44 | 44 |
| Catalyst 3 (Embodiment) | 76 | 42 | 42 |
| Catalyst 4 (Embodiment) | 78 | 43 | 45 |
| Catalyst 5 (Embodiment) | 76 | 45 | 48 |
| Catalyst 6 (Embodiment) | 70 | 40 | 40 |
| Catalyst 1 (Comparative Example) | 78 | 46 | 46 |

TABLE 3

| Catalyst | CO adsorbent (PM) | CO adsorbent enthalpy (kJ/mol-PM) | Recovery/non-recovery of NOx |
|---|---|---|---|
| Catalyst 1 (Embodiment) | Pd | 142 | Recovered |
| Catalyst 2 (Embodiment) | Co | 128 | Not recovered |
| Catalyst 3 (Embodiment) | Ni | 125 | Not recovered |
| Catalyst 4 (Embodiment) | Ir | 142 | Recovered |
| Catalyst 5 (Embodiment) | Ru | 160 | Recovered |
| Catalyst 6 (Embodiment) | Ag | 27 | Not recovered |
| Catalyst 1 (Comparative Example) | Rh, Pt | Rh: 138, Pt: 132 | Not recovered |

TEST EXAMPLE 2

A power X-ray diffractometry was used to measure the structure of Sr in catalyst 1 (Embodiments 1 to 6). SrTiO$_3$ as a composite oxide of Sr and Ti was formed in any one of Embodiments 1 to 6.

TEST EXAMPLE 3

Catalyst 1 (Embodiment) and catalyst 1 (Comparative Example) were used to measure how CO desorption temperature rose.

(Test Procedure)

A reaction tube was filled with 1 g of powdered catalyst, and temperature was raised to 400° C. in the flow of He gas. Temperature was held at 400° C., and the tube was passed through the 3% CO—He gas for 30 minutes. Then temperature was raised again to 450° C. in the flow of He gas. Temperature was held at 450° C. in the flow of He gas for 30 minutes, then it was reduced to 100° C. After it was confirmed by TCD (thermal conductivity detector) gas chromatography that absorbed CO volume reached the saturation point, temperature was raised to 450° C. at the rate of 5° C. per minute in the flow of He gas. To detect CO desorbed from the catalyst, a TCD gas chromatograph was connected to the reaction tube outlet.

(Test result)

Figure 1:
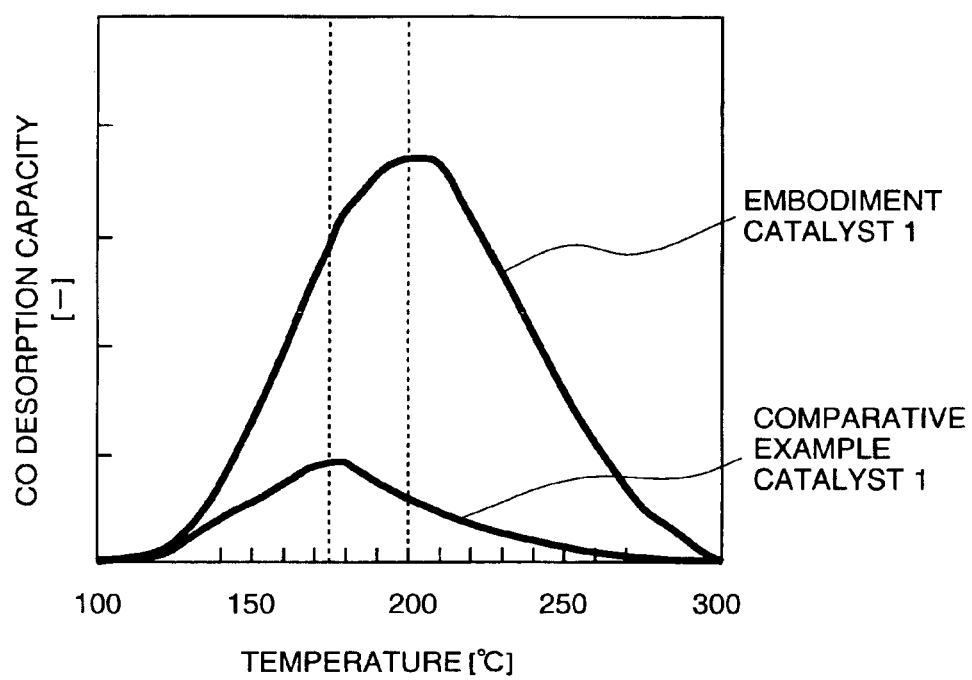
FIG. 1 shows the relationship between the CO desorption capacity and temperature for catalyst 1 (embodiment) and catalyst 1 (comparative example).

FIG. 1 shows the test result. TCD gas chromatography uses the TCD to measure the thermal conductivity of gas. In the flow of He gas, the thermal conductivity of gas detected by the TCD increases in proportion to CO temperature in the gas. So desorption of CO from the catalyst due to temperature rise causes CO concentration in the gas to be increased. This results in an increase in the thermal conductivity of gas detected by the TCD. CO desorption intensity shown in Table 1 indicates a relative intensity of the thermal conductivity of gas detected by the TCD. For catalyst 1 (Embodiment), the adsorbed CO volume reaches the maximum level at 220° C. For catalyst 1 (Comparative Example), however, the adsorbed CO volume reaches the maximum level at 175° C. To recover the NOx removing performance by regeneration, therefore, it is necessary to use CO adsorbent which has a CO adsorption power to ensure that the adsorbed CO volume reaches the maximum level at about 200° C.

TEST EXAMPLE 4

Model gas for reduction atmosphere was made to pass through catalyst 1 (Embodiment) at the temperature ranging 250 to 500° C. to measure the NOx removing rate and hydrocarbon removing rate.

NOx removing rate was assumed as the rate of reduction in NOx concentration before and after gas was passed through the catalyst layer one minute after switching over to model gas for oxidation atmosphere.

Hydrocarbon removing rate was assumed as the rate of reduction in hydrocarbon concentration before and after gas was passed through the catalyst layer one minute after switching over to model gas for oxidation atmosphere.

The result of measurement indicates that NOx removing rate reached almost 100% level at the temperature ranging from 250 to 500° C. The hydrocarbon removing rate was 80% or more at 300° C. or more, arriving at almost 100% at 400° C. or more.

(Embodiment 2)

For catalyst 1 (Embodiment), the carried Pd volume was changed with respect to 100 g of carrier at the rate of 0.20 to 3.5 g to study the resistance to SOx poisoning according to the test example 1 of Embodiment 1. The rise of Co desorption temperature was also measures according to Test example 3.

Table 4 shows the result. The range of the carried Pd volume where NOx removing performances by regeneration was recovered was 0.25 to 3.0 g with respect to 100 g of carrier. Within said range, the temperature where the desorbed CO volume reaches the maximum level was 200 to 220° C. When the carried Pd volume is 0.85 g or more, there is no improvement in the recovery of NOx removing performances by regeneration even if the carried volume is increased. Consequently, to keep the volume of Pb used to the necessary minimum, the range of the carried Pd volume is preferred to be 0.25 to 0.8 g with respect to 100 g of carrier.

TABLE 4

| Added Pd volume with respect to 100 g of carrier (g) | Initial NOx removing rate (%) | NOx removing rate (%) after SOx poisoning | NOx removing rate (%) after regeneration | Temperature where desorbed CO volume reaches the maximum level (° C.) |
| --- | --- | --- | --- | --- |
| 0.20 | 78 | 46 | 46 | 175 |
| 0.25 | 80 | 47 | 49 | 200 |
| 0.80 | 95 | 50 | 55 | 220 |
| 0.85 | 85 | 45 | 48 | 200 |
| 3.0 | 80 | 45 | 58 | 200 |
| 3.5 | 78 | 45 | 45 | 175 |

(Embodiment 3)

Catalysts 1 to 7 (Embodiments) carrying Si and Zr were prepared according to catalyst 1 (Embodiment). Table 5 shows catalyst compositions.

The inventors of the present invention examined resistance to SOx poisoning according to Test Example 1 of Embodiment 1.

(Test Result)

Table 6 shows the rest result. Any one of catalysts (Embodiments 7 to 17) exhibited recovery of NOx removing performance by regeneration. Especially catalysts (Embodiments 15 to 17) including Zr and Ti made a remarkable recovery of NOx removing performance by regeneration.

TABLE 5

| Catalyst | 1st component | 2nd component | 3rd component |
| --- | --- | --- | --- |
| Catalyst 7 (Embodiment) | 14Ce, 6Zr, 6Ti, 6Si | 0.26Pd, 11Sr, 4Ti, 0.9Mg, 0.11Rh, 1.4Pt | Not included |
| Catalyst 8 (Embodiment) | 14Ce, 6Si | 0.26Pd, 11Sr, 4Ti, 0.9Mg, 0.11Rh, 1.4Pt | Not included |
| Catalyst 9 (Embodiment) | 14Ce, 6Zr | 0.26Pd, 11Sr, 4Ti, 0.9Mg, 0.11Rh, 1.4Pt | Not included |
| Catalyst 10 (Embodiment) | 14Ce, 6Ti | 0.26Pd, 11Sr, 4Ti, 0.9Mg, 0.11Rh, 1.4Pt | Not included |
| Catalyst 11 (Embodiment) | 14Ce, 6Zr, 6Ti | 0.26Pd, 11Sr, 4Ti, 0.9Mg, 0.11Rh, 1.4Pt | Not included |
| Catalyst 12 (Embodiment) | 14Ce | 0.26Pd, 11Sr, 4Ti, 0.9Mg, 0.11Rh, 1.4Pt | 4Ti |
| Catalyst 13 (Embodiment) | 14Ce, 6Zr | 0.26Pd, 11Sr, 4Ti, 0.9Mg, 0.11Rh, 1.4Pt | 4Ti |
| Catalyst 14 (Embodiment) | 14Ce, 6Ti | 0.26Pd, 11Sr, 4Ti, 0.9Mg, 0.11Rh, 1.4Pt | 4Ti |
| Catalyst 15 (Embodiment) | 14Ce, 6Zr, 6Ti | 0.26Pd, 11Sr, 4Ti, 0.9Mg, 0.11Rh, 1.4Pt | 4Ti |
| Catalyst 16 (Embodiment) | 14Ce, 6Zr, 6Ti | 0.75Pd, 11Sr, 4Ti, 0.9Mg, 0.11Rh, 1.4Pt | 4Ti |
| Catalyst 17 (Embodiment) | 14Ce, 6Zr, 6Ti, 6Si | 0.75Pd, 11Sr, 4Ti, 0.9Mg, 0.11Rh, 1.4Pt | 4Ti |

TABLE 6

| Catalyst | Initial NOx removing rate (%) | NOx removing rate (%) after SOx poisoning | NOx removing rate (%) after regeneration |
| --- | --- | --- | --- |
| Catalyst 7 (Embodiment) | 71 | 45 | 49 |
| Catalyst 8 (Embodiment) | 72 | 42 | 44 |
| Catalyst 9 (Embodiment) | 80 | 43 | 47 |
| Catalyst 10 (Embodiment) | 78 | 44 | 46 |
| Catalyst 11 (Embodiment) | 80 | 41 | 45 |
| Catalyst 12 (Embodiment) | 80 | 54 | 56 |
| Catalyst 13 (Embodiment) | 76 | 52 | 56 |
| Catalyst 14 (Embodiment) | 69 | 40 | 42 |
| Catalyst 15 (Embodiment) | 63 | 41 | 50 |
| Catalyst 16 (Embodiment) | 61 | 40 | 48 |
| Catalyst 17 (Embodiment) | 65 | 41 | 49 |

(Embodiment 4)

The carried Ti volume in catalyst 1 (Embodiment) was changed with respect to 100 g of carrier at the rate of 2 to 40 g to study the resistance to SOx poisoning according to the test example 1 of Embodiment 1. Table 7 shows the result of this study. When the carried Ti volume is 2 g or less, there was no recover of the NOx removing rate by regeneration. Initial NOx removing rate was reduced by increase of the carried Ti volume. To maintain the initial NOx removing rate at 60% or more, carried Ti volume of 3 to 15 g gives good results. Furthermore, to keep the initial NOx removing rate at 50% or more, good results are provided by carried Ti volume of 3 to 35 g.

TABLE 7

| Carried Si volume with respect to 100 g of carrier (g) | Initial NOx removing rate (%) | NOx removing rate (%) after SOx poisoning | NOx removing rate (%) after regeneration |
| --- | --- | --- | --- |
| 2 | 82 | 42 | 42 |
| 3 | 80 | 46 | 48 |
| 4 | 80 | 47 | 49 |
| 15 | 68 | 40 | 43 |
| 18 | 58 | 37 | 40 |
| 35 | 50 | 30 | 33 |
| 40 | 42 | 23 | 26 |

(Embodiment 5)

The carried Si volume in catalyst 8 (Embodiment) was changed with respect to 100 g of carrier at the rate of 2 to 30 g to study the resistance to SOx poisoning according to the test example 1 of Embodiment 1. Table 8 shows the result of this study. When the carried Si volume is 2 g or less, there was no recover of the NOx removing rate by regeneration. Initial NOx removing rate was reduced by increase of the carried Si volume. To maintain the initial NOx removing rate at 60% or more, carried Si volume of 3 to 10 g gives good results. Furthermore, to keep the initial NOx removing rate at 50% or more, good results are provided by carried Ti volume of 3 to 25 g.

TABLE 8

| Carried Si volume with respect to 100 g of carrier (g) | Initial NOx removing rate (%) | NOx removing rate (%) after SOx poisoning | NOx removing rate (%) after regeneration |
| --- | --- | --- | --- |
| 2 | 82 | 42 | 42 |
| 3 | 80 | 46 | 48 |
| 6 | 72 | 42 | 44 |
| 10 | 63 | 38 | 41 |
| 15 | 56 | 34 | 36 |
| 25 | 50 | 31 | 33 |
| 30 | 38 | 25 | 26 |

(Embodiment 6)

The carried Zr volume in catalyst 15 (Embodiment) was changed with respect to 100 g of carrier at the rate of 2 to 30 g to study the resistance to SOx poisoning according to the test example 1 of Embodiment 1. Table 9 shows the result of this study. When the carried Zr volume is 2 g or less, where was no recover of the NOx removing rate by regeneration. Initial NOx removing rate was reduced by increase of the carried Zr volume. To maintain the initial NOx removing rate at 60% or more, carried Zr volume of 3 to 10 g gives good results. Furthermore, to keep the initial NOx removing rate at 50% or more, good results are provided by carried Zr volume of 3 to 25 g.

TABLE 9

| Carried Zr volume with respect to 100 g of carrier (g) | Initial NOx removing rate (%) | NOx removing rate (%) after SOx poisoning | NOx removing rate (%) after regeneration |
| --- | --- | --- | --- |
| 2 | 82 | 42 | 42 |
| 3 | 72 | 45 | 48 |
| 6 | 63 | 41 | 50 |
| 10 | 60 | 38 | 43 |
| 15 | 57 | 34 | 38 |
| 25 | 50 | 31 | 35 |
| 30 | 36 | 25 | 28 |

(Embodiment 7)

Catalysts 18 and 19 (Embodiments) were prepared according to the Embodiment 1. Table 10 shows the compositions and their percentage of catalysts 18 and 19 (Embodiments). The inventors of the present invention also examined resistance of catalysts 18 and 19 (Embodiments) to SOx according to the test example 1. The result is given in Table 11. Catalysts 18 and 19 (Embodiments) exhibited recovery of NOx removing performance.

TABLE 10

| Catalyst | 1st component | 2nd component | 3rd component |
| --- | --- | --- | --- |
| Catalyst 18 (Embodiment) | 14Ce | 0.07Rb, 1.5Pt | 10Na, 2Ti, 0.9Mg, 0.75Pd |
| Catalyst 19 (Embodiment) | 27Ce | 0.07Rh, 1.5Pt, 0.23Pd | 10Na, 2Ti, 0.9Mg |

TABLE 11

| Catalyst | Initial NOx removing rate (%) | NOx removing rate (%) after SOx poisoning | NOx removing rate (%) after regeneration |
| --- | --- | --- | --- |
| Catalyst 18 (Embodiment) | 90 | 68 | 70 |
| Catalyst 19 (Embodiment) | 90 | 50 | 52 |

As decribed above the exhaust gas cleaning method, exhaust gas cleaning catalyst and exhaust gas cleaning device according to the present invention have made it possible to improve NOx removing performances while maintaining resistance against SOx poisoning in the oxidation atmosphere.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for cleaning an exhaust gas emitted from an internal combustion engine, wherein:

exhaust gas having an air-fuel ratio higher than a theoretical air-fuel ratio and exhaust gas having an air-fuel ratio less than or equal to the theoretical air-fuel ratio are alternately made to contact a catalyst to clean the exhaust gas discharged from the internal combustion engine thereby removing nitrogen oxides in exhaust gas;

said catalyst contains;

at least one element selected from a first group consisting of alkaline and alkaline earth metals;

Rh and Pt;
at least one element selected from a second group consisting of Ti, Si and Zr; and
a CO adsorbent component where the absolute value of CO adsorbent enthalpy on the metal single crystal surface is 142 KJ/mol or more, said CO adsorbent component comprising at least one element selected from the group consisting of Pd, Ir, and Ru in an amount of from 0.25 to 3 grams per 100 grams of a carrier for said catalyst;
said catalyst has a CO desorption capacity that reaches a maximum level at a temperature within the range from 200 to 220° C. when a heating test is performed exclusively on said catalyst by heating at the rate of 5 to 10° C./min. in a He gas flow after said catalyst is saturated with CO by adsorption at 100° C.;
said catalyst comprises a composite oxide formed between said at least one element selected from said first group and said at least one element selected from said second group.

2. An exhaust gas cleaning method for an internal combustion engine according to claim 1, wherein said first group consists of:
Na, Mg, K, Li, Cs, Sr and Ca.

3. An exhaust gas cleaning method for internal combustion engine according to claim 1 wherein said catalyst further contains Ce.

4. An exhaust gas cleaning method for an internal combustion engine according to claim 1, wherein said first group consists of:
Na, Mg, K, Li, Cs, Sr and Ca.

5. An exhaust gas cleaning method for internal combustion engine according to claim 1, wherein said catalyst further contains Ce.

6. The method according to claim 1, wherein said second group consists of Ti and Zr.

7. The method according to claim 1, wherein said catalyst is formed by heat treatment at a temperature of at least 600° C.

8. The method according to claim 1, wherein said catalyst is formed by heat treatment at a temperature of 700° C.

9. The method according to claim 1, wherein said at least one element selected from said second group is Zr.

10. An exhaust gas cleaning method for an internal combustion engine, comprising:
placing an exhaust gas cleaning catalyst in an exhaust gas flow path of the internal combustion engine, said catalyst capturing NOx when the air-fuel ratio of exhaust gas is higher than theoretical air-fuel ratio, and removing said captured NOx by reduction when the air-fuel ratio of exhaust gas is less than or equal to theoretical air-fuel ratio; and
causing an exhaust gas having an air-fuel ratio higher than the theoretical air-fuel ratio and an exhaust gas having an air-fuel ratio less than or equal to the theoretical air-fuel ratio alternately to contact said catalyst, thereby removing nitrogen oxides in exhaust gas; wherein;
said catalyst contains;
at least one alkaline or alkaline earth metal selected from a first group consisting of Na, Mg, K, Li, Cs, Sr and Ca, on the surface of a porous carrier;
at least one element selected from a second group consisting of Pd, Ir and Ru; and
at least one element selected from a third group consisting of Ti, Si and Zr;
ratios of components relative to 100 parts by weight of said porous carrier are 5 to 30 parts by weight for alkaline metal or alkaline earth metal in total, 8 to 35 parts by weight for Ti, 3 to 25 parts by weight for Si, 3 to 25 parts by weight for Zr, 0.05 to 0.5 parts by weight for Rh, 1.5 to 5 parts by weight for Pt, and 0.25 to 3 parts by weight for Pd, Ir and Ru in total;
said catalyst has a CO desorption capacity that reaches a maximum level at a temperature within the range from 200 to 220° C. when a heating test is performed exclusively on said catalyst by heating it at the rate of 5 to 10° C./min. in a He gas flow after said catalyst is saturated with CO by adsorption at 100° C.;
said catalyst comprises a composite oxide formed between said at least one element selected from said first group and said at least one element selected from said third group.

11. The exhaust gas cleaning method according to claim 10, wherein said second group consists of Ti and Zr.

12. The method according to claim 10, wherein said a least one element selected from said second group is Zr.

13. An exhaust gas cleaning method for an internal combustion engine, comprising:
placing an exhaust gas cleaning catalyst in an exhaust gas flow path of the internal combustion engine, said catalyst capturing NOx when the air-fuel ratio of exhaust gas is higher than theoretical air-fuel ratio, and removing said captured NOx by reduction when the air-fuel ratio of exhaust gas is less than or equal to theoretical air-fuel ratio; and
causing an exhaust gas having an air-fuel ratio higher than the theoretical air-fuel ratio and an exhaust gas having an air-fuel ratio less than or equal to the theoretical air-fuel ratio alternately to contact said catalyst, thereby removing nitrogen oxides in exhaust gas; wherein;
said catalyst contains;
at least one alkaline or alkaline earth metal selected from a first group consisting of Na, Mg, K, Li, Cs, Sr and Ca, on the surface of a porous carrier;
a CO adsorbent compound comprising at least one element selected from a second group consisting of Pd, Ir and Ru; and
at least one element selected from a third group consisting of Ti, Si and Zr;
ratios of components relative to 100 parts by weight of said porous carrier are 5 to 30 parts by weight for alkaline metal or alkaline earth metal in total, 8 to 35 parts by weight for Ti, 3 to 25 parts by weight for Si, 3 to 25 parts by weight for Zr, 0.05 to 0.5 parts by weight for Rh, 1.5 to 5 parts by weight for Pt, and 0.25 to 3 parts by weight for Pd, Ir and Ru in total;
said catalyst has a CO desorption capacity that reaches a maximum level at a temperature within the range from 200 to 220° C. when a heating test is performed exclusively on said catalyst by heating it at the rate of 5 to 10° C./min. in a He gas flow after said catalyst is saturated with CO by adsorption at 100° C.; and
said catalyst comprises a composite oxide formed between said at least one element selected from said first group and said at least one element selected from said third group.

14. A method for cleaning an exhaust gas emitted from an internal combustion engine, wherein:
exhaust gas having an air-fuel ratio higher than a theoretical air-fuel ratio and exhaust gas having an air-fuel ratio less than or equal to the theoretical air-fuel ratio are alternately made to contact a catalyst to clean the exhaust gas discharged from the internal combustion engine thereby removing nitrogen oxides in exhaust gas;

said catalyst contains;
- at least one element selected from a first group consisting of alkaline and alkaline earth metals; Rh and Pt;
- at least one element selected from a second group consisting of Ti, Si and Zr; and
- a CO adsorbent component where the absolute value of CO adsorbent enthalpy on the metal single crystal surface is 142 KJ/mol or more, said CO adsorbent component comprising at least one element selected from the group consisting of Pd, Ir, and Ru;

said catalyst has a CO desorption capacity that reaches a maximum level at a temperature within the range from 200 to 220° C. when a heating test is performed exclusively on said catalyst by heating at the rate of 5 to 10° C./min. in a He gas flow after said catalyst is saturated with CO by adsorption at 100° C.; and said catalyst comprises a composite oxide formed between said at least one element selected from said first group and said at least one element selected from said second group.

15. A method for cleaning an exhaust gas emitted from an internal combustion engine, wherein:

exhaust gas having an air-fuel ratio higher than a theoretical air-fuel ratio and exhaust gas having an air-fuel ratio less than or equal to the theoretical air-fuel ratio are alternately made to contact a catalyst to clean the exhaust gas discharged from the internal combustion engine thereby removing nitrogen oxides in exhaust gas;

said catalyst contains;
- at least one element selected from a first group consisting of alkaline and alkaline earth metals; Rh and Pt;
- at least one element selected from a second group consisting of Ti, Zr; and
- a CO adsorbent component where the absolute value of CO adsorbent enthalpy on the metal single crystal surface is 142 KJ/mol or more, said CO adsorbent component comprising at least one element selected from the group consisting of Pd, Ir, and Ru;

said catalyst has a CO desorption capacity that reaches a maximum level at a temperature within the range from 200 to 220° C. when a heating test is performed exclusively on said catalyst by heating at the rate of 5 to 10° C./min. in a He gas flow after said catalyst is saturated with CO by adsorption at 100° C.;

said catalyst comprises a composite oxide formed between said at least one element selected from said first group and said at least one element selected from said second group; and said composite oxide is formed by heat treatment of said catalyst.

* * * * *